United States Patent [19]

Honsberg et al.

[11] Patent Number: 4,824,906

[45] Date of Patent: Apr. 25, 1989

[54] BLENDS OF GRAFTED POLYETHYLENE WITH CHLORINATED POLYETHYLENE

[75] Inventors: Wolfgang Honsberg, Wilmington, Del.; Royce E. Ennis, Beaumont, Tex.

[73] Assignee: E. I. DuPont De Nemours and Company, Wilmington, Del.

[21] Appl. No.: 166,487

[22] Filed: Mar. 10, 1988

Related U.S. Application Data

[63] Continuation-in-part of Ser. No. 75,823, Jul. 20, 1987, abandoned.

[51] Int. Cl.[4] .................. C08L 51/06; C08L 23/26; C08L 23/28; C08L 23/06
[52] U.S. Cl. ........................................ 525/74; 525/78; 525/192; 525/240; 525/334.1; 525/333.7; 525/381; 525/382
[58] Field of Search ................. 525/74, 78, 192, 334.1

[56] References Cited

U.S. PATENT DOCUMENTS

| | | | |
|---|---|---|---|
| 3,671,511 | 6/1972 | Honnen et al. | 525/334.1 |
| 3,868,433 | 2/1975 | Bartz et al. | 525/192 |
| 4,280,940 | 7/1981 | Klug et al. | 525/192 |

FOREIGN PATENT DOCUMENTS

57-102936  6/1982  Japan.
57-128730  8/1982  Japan.

*Primary Examiner*—Carman J. Seccuro

[57] ABSTRACT

A blend of 80–99 weight percent chlorinated polyethylene containing 15–60 weight percent chlorine with 20–1 weight percent of polyethylene containing up to 5 weight percent chlorine and 0.5–5 weight percent of a grafted unsaturated dicarboxylic acid or anhydride is disclosed. The preferred chlorinated polyethylene is made by chlorinating a blend of high and low density polyethylene.

6 Claims, No Drawings

BLENDS OF GRAFTED POLYETHYLENE WITH CHLORINATED POLYETHYLENE

CROSS-REFERENCE TO RELATED APPLICATION

This application is a continuation-in-part of Ser. No. 075,823 filed July 20, 1987, now abandoned.

BACKGROUND OF THE INVENTION

The present invention relates to blends of chlorinated polyethylene and polyethylene grafted with unsaturated dicarboxylic acids or anhydrides. Chlorinated polyethylene is used for hose constructions and for insulation and jacketing in the wire and cable industry. For most applications the polymer is vulcanized but in a few others the material is employed as an uncured thermoplastic product.

Commercially available chlorinated polyethylenes, especially those types prepared by solution chlorination, frequently have comparatively low viscosity at elevated temperatures and a low modulus after cure. In thermoplastic applications the polymer and its blends have difficulties in meeting the requirements of oil resistance and heat distortion.

The chlorinated polyethylenes useful for thermoplastic applications typically contains only 25% chlorine; at this chlorine level some crystallinity of the polyethylene base polymer is retained and provides strength. However, for many end uses this residual crystallinity is insufficient to provide the required properties and polyethylene is therefore added to the recipe. Blends of chlorinated polyethylene and polyethylene are not compatible and the physical properties are therefore only fair.

Now it has been found that adding 1-20 parts of polyethylene grafted with unsaturated dicarboxylic acids or anhydrides per 100 parts chlorinated polyethylene has a beneficial effect and provides significant improvements in modulus, tensile strength, oil resistance and heat distortion in recipes used for thermoplastic applications and improves the viscosity and tensile strength of compositions suitable for use in thermoset applications.

SUMMARY OF THE INVENTION

The present invention involves blends of chlorinated polyethylene with either polyethylene grafted with unsaturated dicarboxylic acids or anhydrides or the corresponding chlorinated graft polyethylenes. The chlorinated polyethylene can be based on either high density polyethylene, conventional low density polyethylene, linear low density polyethylene or blends thereof. The polyethylene grafted with the unsaturated dicarboxylic acid or anhydride can either be blended with the chlorinated polyethylene or it may be blended with polyethylene and the blend then chlorinated. In the latter case, the polyethylene grafted with the unsaturated dicarboxylic acid is also chlorinated. Optionally, the effectiveness of the grafted polyethylene can be increased by a modification of the functional group of the grafted polyethylene, for example, by reacting it with gamma-aminopropyltriethoxysilane or amines having 2-4 carbon atoms and 2-4 amino groups or their carbamate derivatives. These compounds, added as compounding ingredients to the recipe, result in a further increase in modulus and tensile strength.

DETAILED DESCRIPTION OF THE INVENTION

The polymer blend compositions of this invention contain about 80-99 parts by weight, preferably 90-95 parts by weight, of chlorinated polyethylene. The chlorinated polyethylene is prepared by chlorination of high density polyethylene, low density branched polyethylene, linear low density polyethylene, and mixtures thereof, and has a chlorine content of from 15 to 60 percent chlorine, preferably 20-40 percent chlorine. The term "polyethylene" is also intended to include polymers of ethylene containing minor amounts, i.e., up to 10%, of other ethylenically unsaturated monomers copolymerizable therewith, especially higher olefins such as propylene or butene-1, or other monomers such as acrylic or methacrylic acids. The polyethylene, preferably, has a sufficiently high molecular weight, e.g., at least about 10,000 wt. average, generally 80,000, to yield an elastomeric material having high tensile strength upon chlorination. The chlorination may be run continuously or in a batch-wise manner at temperatures of 50°-150° C., and at pressures of 1-10 atm. using gaseous chlorine as the chlorinating agent. In solution chlorination, the reaction medium should be an inert solvent, i.e., inert to the reactants, for example, carbon tetrachloride, chlorinated benzene, or chloroform. Alternatively, slurry chlorination can be used. A free radical initiator is required to produce active sites on the polyethylene. Typical of such free radical initiators are ditertiary butyl peroxide, lauroyl peroxide, $\alpha,\alpha'$-azobisisobutyronitrile, or azodicyclohexenecarbonitrile.

The blends of the invention also contain 1-20 parts by weight of 1) polyethylene grafted with an unsaturated dicarboxylic acid or anhydride containing 4-6 carbon atoms such as maleic anhydride, maleic acid, or fumaric acid, or 2) chlorinated polyethylene grafted with an unsaturated dicarboxylic acid or anhydride containing 4-6 carbon atoms such as maleic anhydride, maleic acid, or fumaric acid. The grafted polyethylenes are prepared by the process disclosed in U.S Pat No. Re. 31,680. The chlorinated grafted polyethylenes may be prepared by chlorinating the graft polyethylenes according to the chlorination methods described above for chlorination of polyethylene. Alternatively, the chlorinated graft polyethylenes may be prepared by blending the graft polyethylene with polyethylene and cochlorinating the blend. The grafted polyethylenes contain 0.2-5 wt. percent of the grafted acid moiety, preferably 0.5-1.5 wt. percent, while the chlorinated grafted polyethylenes contain 0.3-1.5 wt. percent of the grafted acid moiety and up to 50 wt % chlorine. Generally the chlorinated grafted polyethylenes will contain 20-35 wt % chlorine. When the grafted polyethylene is not cochlorinated with the polyethylene it generally will contain 0-5 wt % chlorine.

The polymer blends of this invention may be prepared either by mixing polyethylene and the ethylene graft polymer and cochlorinating the blend or by blending chlorinated polyethylene with either chlorinated or chlorine-free graft polymer. In the latter case, mixing may be done by any suitable means, for example, on a two-roll rubber mill or in an internal mixer. The temperature should be above the melting point of the polymers, and is generally about 140°-150° C. Temperatures above about 200° C. should be avoided to minimize the degradation of the chlorinated polyethylene.

The blends of the invention may be further compounded with pigments, fillers, processing aids, and antioxidants. These additives are usually present in amounts of 0.1 to 200 parts per hundred parts polymer. Representative fillers include carbon black, calcium carbonate, calcined clay, hydrated silicas and alumina. A representative pigment is titanium dioxide. Processing aids which may be added to the blend include hydrocarbon oils, stearic acid, and low molecular weight PE. Antioxidants include the usual phenolic or amine types.

The polymer blend may also be compounded with conventional curing agents and accelerators used in curing chlorinated elastomers to give thermosetting compositions. If a curing agent is added, it may be any of the conventional curing agents employed to crosslink chlorinated polyethylene elastomers. Representative peroxide curing agents include compounds such as dicumyl peroxide; 2,5,-dimethyl-2,5-di(t-butylperoxy)-hexyne-3; 2,5-dimethyl-2,5-di-(t-butylperoxy hexane); di-t-butyl peroxide; 2,5-di-(t-amylperoxy)-2,5-dimethylhexane; 2,5-di(t-butylperoxy)-2,5-diphenylhexane; bis-(alpha-methylbenzyl)peroxide; and bis-(t-butylperoxy)-diisopropylbenzene. The amounts used are generally from about 1-8 parts per 100 parts chlorinated elastomer, usually about 1.5 to 4 parts per 100 parts rubber (phr). Also, 2,5-dimercapto-1,3,4-thiadiazole and derivatives or analogs thereof can be used as curing agents. Usually, such curing agents are added in amounts from about 1 to 5 phr.

Optionally, one or more conventional accelerators can be added to the polymer blend in amounts of about 0.2-2 phr to improve the rate of cure.

Coagents can be used during the peroxide curing procedure. Such coagents are well known in the art and include, for example, triallylisocyanurate, triallylcyanurate, N, N'-m-phenylenedimaleimide, and the like.

When the blends are compounded with additives to give thermosetting compositions, the temperature at which the additional ingredients are mixed into the polymer should be no higher than 90° C. to prevent scorching.

The tensile strength and modulus of compounded stocks of the grafted polyethylene/chlorinated polyethylene blends of this invention can be increased by modification of the functional group of the grafted polyethylene. For example, the acid moiety may be reacted with gamma-aminopropyltriethoxysilane, or with amines having 2-14 carbon atoms and 2-4 amino groups or their carbamate derivatives, or a silane of the formula $Si-A_n, -B_m, -C$ where -A is alkyl of 1 to 3 carbon atoms such as methyl or ethyl, -B is alkoxy of 1 to 3 carbon atoms such as methoxy or ethoxy, and -C is $-X-NH_2$ or $-X-NH-X-NH_2$ where -X- is alkylene of 1 to 3 carbon atoms such as methylene, ethylene or propylene, $m+n=3$ and n is 0 or 1.

The blends of this invention are useful for the insulation of wire and cables.

EXAMPLES

Example 1

A polymer blend of this invention was prepared by mixing 95 parts chlorinated polyethylene having a chlorine content of 36 wt. % and 5 parts of polyethylene grafted with maleic anhydride (melt index 5.4, maleic anhydride content 0.5 wt. %) Polymer I on a two-roll rubber mill at a temperature of 140°-150° C. The material was passed through the rolls several times until a good dispersion was achieved. The following additives were then milled into the polymer stock at a temperature of 50° C.: 65 parts calcium carbonate ("Atomite Whiting"), 60 parts clay, 15 parts SRF carbon black, 43 parts di-isodecylphthalate, 10 parts magnesium oxide, 2 parts triallylcyanurate, and 5 parts dicumyl peroxide ("Di-Cup 40C"). The compounded stock was compression molded at 150°-170° C. The compound viscosity and stress-strain properties were measured according to ASTM D-1646-81 and D-412, respectively. Results are reported in Table 1.

Example 2

A compounded blend was prepared in the same manner and with the same ingredients as described in Example 1, except that 85 parts chlorinated polyethylene and 15 parts grafted polyethylene Polymer I were used. Compound viscosity and stress-strain data are reported in Table 1.

Example 3

A polymer blend was prepared by mixing 90 parts chlorinated polyethylene having a chlorine content of 36 wt percent and 10 parts of polyethylene grafted with maleic anhydride (melt index 1.04, maleic anhydride content 0.9 wt. %) Polymer II on a two-roll rubber mill at a temperature of 140°14 150° C. The material was passed through the rolls several times until a good dispersion was achieved. The same additives, in the same amounts as described in Example 1, were milled into the polymer blend. The compounded stock was compression molded at 140°-150° C. The compound viscosity and stress-strain properties were measured according to ASTM D-1646-81 and D-412, respectively. Results are reported in Table 1.

Example 4

A polymer blend was prepared by mixing 90 parts chlorinated polyethylene having a chlorine content of 36 wt. % and 10 parts of polyethylene grafted with maleic anhydride (melt index 2.5, maleic anhydride content 0.9 wt. %) Polymer III on a two-roll rubber mill at a temperature of 140°-150° C. A compounded stock was prepared using the same additives, in the same amounts as described in Example 1. Compound viscosity and stress-strain properties are reported in Table 1.

COMPARATIVE EXAMPLE 1

A compounded rubber stock based on 100 parts chlorinated polyethylene of chlorine content 36 wt. % was prepared as described in Example 1, using the same additives, in the same amounts. Compound viscosity and stress-strain data are reported in Table 1.

TABLE I

|  | Example 1 | Example 2 | Example 3 | Example 4 | Comparative Example 1 |
|---|---|---|---|---|---|
| Chlorinated Polyethylene | 95 | 85 | 90 | 90 | 100 |

TABLE I-continued

|  | Example 1 | Example 2 | Example 3 | Example 4 | Comparative Example 1 |
|---|---|---|---|---|---|
| (36 wt. % Cl) | | | | | |
| Graft Polymer I (0.5 wt % grafted maleic anhydride) | 5 | 15 | — | — | — |
| Graft Polymer II (1.04 wt % grafted maleic anhydride) | — | — | 10 | — | — |
| Graft Polymer III (0.9 wt % grafted maleic anhydride) | — | — | — | 10 | — |
| $CaCO_3$ | 75 | 75 | 75 | 75 | 75 |
| Clay | 60 | 60 | 60 | 60 | 60 |
| SRF Carbon Black | 15 | 15 | 15 | 15 | 15 |
| Diisodecylphthalate | 43 | 43 | 43 | 43 | 43 |
| MgO | 10 | 10 | 10 | 10 | 10 |
| Triallylcyanaurate | 2 | 2 | 2 | 2 | 2 |
| Dicumyl peroxide (40% active ingredient) | 5 | 5 | 5 | 5 | 5 |
| Mooney Viscosity (Compound Stock) $ML_1 + 4$, ASTM D-1646-81 | | | | | |
| 121° C. | 31 | 40 | 39 | 39 | 25 |
| 150° C. (minimum) | 24 | 27 | 36 | 32 | 18 |
| 177° C. (minimum) | 27 | 33 | 43 | 38 | 19 |
| Stress-Stain Properties (Cured 30 min/160° C.) ASTM D-412 | | | | | |
| $M_{100}$ (MPa) | 4.4 | 5.5 | 5.0 | 5.1 | 3.4 |
| $T_B$ (MPa) | 8.1 | 8.6 | 8.6 | 8.3 | 8.6 |
| $E_B$ (%) | 416 | 426 | 433 | 421 | 502 |

Example 5 and Example 6

These two examples demonstrate that the beneficial effect of the addition of grafted polyethylene to chlorinated polyethylene is not restricted to chlorinated polymers based on high density polyethylene. Polymer I of Examples 5 and 6 was prepared by chlorinating a 1:1 blend of high (0.96–0.97) and low (0.93) density polyethylene until the material contained 36.2% chlorine by weight. This material was then compounded with polyethylene grafted with maleic anhydride following the procedure described in Example 1 (Polymer II). The formulation as well as the test methods are identical to those of Example 1. The results are reported in Table II.

Comparative Example 2

A compounded rubber stock based on 100 parts of the same chlorinated polyethylene employed in Examples 5 and 6 was prepared as described in Examples 5 and 6 using the same amounts, except that the polyethylene grafted with maleic anhydride was omitted. The results are reported in Table II.

TABLE II

|  | Comparative Example 2 | Ex. 5 | Ex. 6 |
|---|---|---|---|
| Polymer | | | |
| Chlorinated Polyethylene (Polymer I, 36 wt % Cl) | 100 | 97.5 | 92.5 |
| Graft Polymer (Polymer II, 1.04 wt % grafted maleic anhydride) | — | 2.5 | 7.5 |
| $CaCO_3$ | 75 | 75 | 75 |
| Clay | 60 | 60 | 60 |
| SRF Carbon Black | 15 | 15 | 15 |
| Diisodecylphthalate | 43 | 43 | 43 |
| MgO | 10 | 10 | 10 |
| Triallylcyanurate | 2 | 2 | 2 |
| Dicumyl Peroxide (40% active ingredient) | 5 | 5 | 5 |
| Compounded Viscosity $ML\ 1 + 4$ at | | | |
| 100° C. | 29.0 | 36.0 | 39.0 |
| 150° C. | 21.5 | 30.6 | 38.0 |
| 177 | 22.1 | 35.0 | 45.0 |
| Stress/Strain Properties Cured 30 min. at 160° C. Original | | | |
| $M_{100}$ (MPa) | 4.3 | 5.3 | 6.1 |
| $T_B$ (MPa) | 8.6 | 8.7 | 9.2 |
| $E_B$ (%) | 395 | 333 | 315 |
| Heat-Aged | | | |
| % Retention $E_B$ | 23 | 27 | 21 |
| Compression Set (%) | | | |
| 22 hrs./70° C. | 36 | 33 | 37 |

Example 7

The next two examples illustrate that the polyethylene grafted with maleic anhydride does not have to be blended mechanically with the chlorinated polyethylene but can be added to the polyethylene serving as a starting material for the chlorinated material. In this case the polyethylene grafted with maleic anhydride will also be chlorinated.

Polymer V was prepared by dissolving 90 parts of high density polyethylene having a melt index of 0.8 and a density of 0.96–0.97 and 10 parts of polyethylene having a melt index of 0.89 grafted with 1.04% by weight maleic anhydride in carbon tetrachloride; then the solution was chlorinated until the polymer blend contained 36% chlorine.

This polymer was compounded, using the same formulation as in Example 1, and evaluated using the same test procedure as in Example 1. The results are reported in Table III.

Example 8

This example shows that the beneficial effects of polyethylene grafted with maleic anhydride are also apparent when it is co-chlorinated with a blend of high and low density polyethylene.

Polymer VI was prepared by dissolving 45 parts of high density polyethylene having a melt index of 0.4 and a density of 0.96-0.97, 45 parts of low density polyethylene having a melt index of 0.25 and a density of 0.935 and 10 parts of polyethylene having a melt index of 0.89 grafted with 1.04 wt. % maleic anhydride in carbon tetrachloride and then chlorinated until the resulting polymer mixture contained 36% chlorine.

The polymer was then compounded, using the same formulation as set forth in Example 1, and evaluated in accordance with the test methods described in Example 1. The results are reported in Table III.

TABLE III

|  | Example 7 | Example 8 |
|---|---|---|
| Polymer |  |  |
| V | 100 | — |
| VI | — | 100 |
| Compounding Ingredients |  |  |
| CaCO$_3$ | 75 | 75 |
| Clay | 60 | 60 |
| SRF Carbon Black | 15 | 15 |
| MgO | 10 | 10 |
| Diisodecylphthalate | 43 | 43 |
| Triallylcyanurate | 2 | 2 |
| Dicumyl Peroxide (40% active ingredient) | 5 | 5 |
| Gum Polymer Viscosity ML 1 + 4 at |  |  |
| 100° C. | — | 104 |
| 121° C. | 78 | 81 |
| 150° C. | — | 48 |
| 177° C. | 27 | 29 |
| Compounded Viscosity ML 1 + 4 at |  |  |
| 121° C. | 20.0 | 40.0 |
| 150° C. | 16.5 | 31.0 |
| Stress-Strain Properties Cured 30 Min. at 160° C. Original |  |  |
| M$_{100}$ (MPa) | 4.2 | 5.2 |
| T$_B$ (MPa) | 9.2 | 10.1 |
| E$_B$ (%) | 383 | 360 |
| Compression Set (%) |  |  |
| 22 hrs./70° C. | 34 | 38 |

Example 9

The presence of a carboxylic anhydride group in the polyethylene grafted with maleic anhydride provides a functional group that can be easily modified. This provides a method, for example, to increase the tensile strength of the vulcanizates containing this polymer or to increase the viscosity of the gum polymer blend. This is illustrated in this and the following example.

A blend of 95 parts of chlorinated polyethylene with 36% chlorine (Polymer I) with 5 parts of polyethylene having a melt index of 2.25 grafted with 0.9% maleic anhydride (Polymer VII) was prepared on a two roll rubber mill and then compounded, using the formulation described in Example 1; in addition however, 1 part of 3-aminopropyltriethoxysilane (APTES) was added. The compound was cured for 30 minutes at 160° C. and then tested in the same way as described in Example 1. The results are reported in Table IV; an increase of 20% in the tensile strength is demonstrated.

Comparative Example 3

This comparative example is the control for Example 10; the formulation and the procedure of Example 10 was followed exactly, the only exception being that the 3-aminopropyltriethoxysilane was omitted. The results are reported in Table IV.

TABLE IV

Modification of the Cure

|  | Comparative Example 3 | Example 9 |
|---|---|---|
| Polymer |  |  |
| I | 95 | 95 |
| VII | 5 | 5 |
| APTES | — | 1 |
| CaCO$_3$ | 75 | 75 |
| Clay | 60 | 60 |
| SRF Carbon Black | 15 | 15 |
| Diisodecylphthalate | 43 | 43 |
| MgO | 10 | 10 |
| Triallylisocyanurate | 2 | 2 |
| Dicumyl Peroxide (40% active ingredient) | 5 | 5 |
| Mooney Viscosity (150° C.) |  |  |
| Minimum | 31 | 33 |
| Stress-Strain Properties |  |  |
| M$_{100}$ (MPa) | 4.6 | 5.4 |
| T$_B$ (MPa) | 8.4 | 10.1 |
| E$_B$ (%) | 430 | 276 |
| Compression Set (22 hrs./70° C.) |  |  |
| % | 29 | 28 |

Example 10

100 parts of Polymer V of Example 8, obtained by co-chlorination of a 9:1 mixture of high density polyethylene having a melt index of 0.8 and a density of 0.96-0.97 and polyethylene having a melt index of 0.89 grafted with 1.04 wt. % maleic anhydride was mixed on a two roll rubber mill with 0.2 parts of the carbamate of hexamethylene diamine, commercially available under the trademark "Diak" #1. The viscosity of the polymer as measured by the Mooney viscosity at 121° C. increased from 82 to 158.

The following examples are concerned with thermoplastic compositions. Therefore, the chlorine content of the chlorinated polyethylene is lower, usually about 25%, and the polymer and its formulations have to be processed above the melting point of the chlorinated polyethylene and its blends.

Example 11

A blend of high density polyethylene having a melt index of 0.8 and a density of 0.96-0.97 and low density polyethylene having a melt index of 0.5 and a density of 0.94 was chlorinated in solution until the polymer mixture contained 26.4% chlorine wherein the high density polyethylene contained 11 wt % chlorine and the low density polyethylene contained 42 wt % chlorine Polymer VIII.

A polymer blend of this invention was prepared by mixing 90 parts of the isolated chlorinated polyethylene blend (Polymer VIII) and 10 parts of polyethylene grafted with maleic anhydride (melt index 2.5, maleic anhydride content 0.9 wt %) Polymer IX on a two-roll rubber mill at a temperature of 140°-150° C. until a good dispersion was obtained. The following additives were then milled into the polymer stock at a temperature of 160° C.: 25 parts polyethylene (density 0.960, melt index 2.5), 20 parts HAF carbon black, 25 parts magnesium silicate, 1.5 parts polyethylene (0.960 density having a high melt index, processing aid) 0.8 parts stearic acid, 0.5 parts Agerite Resin D antioxidant, 15.5 parts FR 300 BA flame retardant, and 5 parts dibasic lead phthalate. Mooney viscosity and stress/strain properties are shown in Table V.

Comparative Example 4

The chlorinated polyethylene blend of Example 11 was compounded as described in Example 11, except that no graft polymer was included in the recipe. Test results are reported in Table V.

TABLE V

|  | Example 11 | Comparative Example 4 |
|---|---|---|
| Chlorinated PE Blend (Polymer VIII) | 90 | 100 |
| Graft Polymer IX (Maleic Anhydride Content 0.9 wt %) | 10 | — |
| Polyethylene (density 0.96) | 25 | 25 |
| HAF Carbon Black | 20 | 20 |
| Magnesium Silicate | 25 | 25 |
| Polyethylene (low molecular weight) | 1.5 | 1.5 |
| Stearic Acid | 0.8 | 0.8 |
| Agerite Resin D Antioxidant | 0.5 | 0.5 |
| FR300BA Flame Retardant | 15.5 | 15.5 |
| Dibasic Lead Phthalate | 5 | 5 |
| Mooney Viscosity (177° C.) |  |  |
| ML (1 + 4) | 21.7 | 25 |
| Stress-Strain Property (molded 5 min at 160° C.) |  |  |
| Original |  |  |
| $M_{100}$ (MPa) | 8.7 | 11.5 |
| $T_B$ (MPa) | 7.3 | 9.8 |
| $E_B$ (%) | 416 | 279 |
| Oil Aged (ASTM Oil #2, 18 Hours 100° C.) |  |  |
| $M_{100}$ (MPa) | 3.4 | 8.0 |
| $T_B$ (MPa) | 4.6 | 8.0 |
| $E_B$ (MPa) | 640 | 188 |
| Heat Distortion (121° C.) |  |  |
| % | 61 | 12 |

Example 12

Polymer VIII of Example 11 was mixed with the same graft polymer Polymer IX in the same amounts as described in Example 11. The blend was then further compounded at a temperature of 160° C. with 30 parts polyethylene (density 0.96), 35 parts FEF carbon black, 0.8 parts stearic acid, 0.5 parts Agerite Resin D antioxidant, 10 parts antimony oxide, 12.5 parts FR 300 BA flame retardant, and 5 parts dibasic lead phthalate. Mooney viscosity and stress/strain data are reported in Table VI.

Comparative Example 5

Polymer VIII of Example 11 was compounded as described in Example 12, except that no graft polymer was included in the recipe. Test results are shown in Table VI.

TABLE VI

|  | Example 12 | Comparative Example 5 |
|---|---|---|
| Polymer VIII | 90 | 100 |
| Graft Polymer IX (Maleic Anhydride content 0.9 wt. %) | 10 | — |
| Polyethylene (density 0.960) | 30 | 30 |
| FEF Carbon Black | 35 | 35 |
| Stearic Acid | 0.8 | 0.8 |
| Agerite Resin D Antioxidant | 0.5 | 0.5 |
| Antimony Oxide | 10 | 10 |
| FR 300 BA Flame Retardant | 12.5 | 12.5 |
| Dibasic Lead Phalate | 5 | 5 |
| Mooney Viscosity (177° C.) |  |  |
| $ML_{(1 + 4)}$ | 22 | 26 |
| Stress/Strain Properties (molded 5 min/160° C.) |  |  |
| Original |  |  |
| $M_{100}$ (MPa) | 9.7 | 11.2 |
| $T_B$ (MPa) | 6.7 | 9.7 |
| $E_B$ (%) | 420 | 248 |

Examples 13 and 14, Comparative Example 6

Polyethylene grafted with maleic anhydride is not the only material suitable for use according to this invention. Example 13 demonstrates that polyethylene grafted with fumaric acid is as efficient in improving the properties of a thermoplastic chlorinated polyethylene compound.

In Example 13, 80 parts of a chlorinated polyethylene containing 25% chlorine (Polymer X) were blended with 20 parts of polyethylene grafted with 1% fumaric acid (Polymer XI) on a hot rubber mill; the compounding was continued until all the ingredients of the formulation listed in Table VII were well dispersed in the polymer matrix. The compound was sheeted off the mill and molded 10 minutes at 160° C. The properties were determined as described in Example 1. The results are reported in Table VII.

Example 14 differs from the previous example (#13) only in the type of grafted polyethylene that has been used. In Example 14 the same chlorinated polyethylene is employed as in Example 13, but polyethylene having a melt index of 5.4 grafted with 0.5 wt % maleic anhydride (Polymer XII) was used as an additive. The compounding and testing procedure was the same as in Example 13. The results are summarized in Table VII.

Comparative Example 6 utilizes the same chlorinated polyethylene and the same formulation as Examples 13 and 14; only the grafted polyethylene has been omitted. The procedure in compounding and testing in Example 13 was followed. The results are reported in Table VI.

Example 15

Plasticizers can be also used in thermoplastic chlorinated polyethylene formulations. This example shows that the addition of di-octylsebacate reduces the viscosity and stress-strain properties but that the important heat distortion is only slightly affected.

Chlorinated polyethylene with 25% chlorine (Polymer 10 and identical with the polymer used in Example 13 and 14) was compounded on a hot rubber mill with polyethylene grafted with fumaric acid (Polymer 11) and the other ingredients listed in the recipe of Table VI including 20 parts of di-octylsebacate. The testing was carried out according to Example 1. The results are reported in Table VI.

TABLE VII

|  | Comp. Ex. 6 | Ex. 13 | Ex. 14 | Ex. 15 |
|---|---|---|---|---|
| Polymer |  |  |  |  |
| X | 100 | 80 | 80 | 80 |
| XI | — | 20 | — | 20 |
| XII | — | — | 20 | — |
| di-octyl-sebacate | — | — | — | 20 |
| Mooney Viscosity |  |  |  |  |
| ML (1 + 4) at 150° C. | 55 | 86 | 64 | 42 |
| Original Properties |  |  |  |  |
| $M_{100}$ (MPa) | 9.6 | 13.0 | 13.0 | 8.3 |
| $T_{max}$ (MPa) | 10.0 | 13.6 | 13.9 | 8.7 |

TABLE VII-continued

|  | Comp. Ex. 6 | Ex. 13 | Ex. 14 | Ex. 15 |
|---|---|---|---|---|
| $E_B$ (%) | 610 | 325 | 375 | 305 |
| Heat Distortion (121° C./2000 g) | | | | |
| % | 25.0 | 4.8 | 7.6 | 7.7 |

Recipe: (In addition) Polyethylene, (density 0.96), 20; carbon black, 40; Lead Stearate, 1; dibasic lead phthalate ("Dythal"), 7; diglycidyl ether of bisphenol A ("Epon" 828), 2; "Irganox" 1010 phenolic antioxidant, 0.2.

Example 16 and Comparative Example 7

The grafted polyethylenes of this invention retain most properties of the polyethylene from which they are derived and the argument could be made that an identical improvement in chlorinated polyethylene formulations could be achieved through the addition of polyethylene instead of grafted polyethylene. This possibility can be rejected on the basis of Example 16 and Comparative Example 7.

Example 16 uses a chlorinated polyethylene with 25% chlorine (Polymer XIII) that is compounded on a hot rubber mill with 15 phr Polymer XI of Example 13 and 25 phr polyethylene Polymer XIV according to the recipe shown in Table VIII, following the procedure of Example 11. The testing was carried out as outlined in Example 1; the results are shown in Table VII.

Comparative Example 7 is based on the same chlorinated polyethylene as Example 16 but in this case no grafted polyethylene is added; instead the amount of polyethylene grafted with fumaric acid Polymer VIII was replaced by polyethylene (Polymer XIV). The remainder of the formulation is identical to the one of Example 16. The compounding and evaluation of the composition was also identical to those of Example 16. The results are reported in Table VIII; the heat distortion shows clearly the superiority of a composition containing polyethylene grafted with maleic anhydride.

TABLE VIII

|  | Comparative Example 7 | Example 16 |
|---|---|---|
| Polymer | | |
| XII | 100 | 100 |
| XI | 40 | 25 |
| XIV | — | 15 |
| Viscosity | | |
| ML (1 + 4)/177° C. | 16.5 | 22.0 |
| Stress-Strain Properties | | |
| Original | | |
| $M_{100}$ (MPa) | 9.1 | 11.0 |
| $T_B$ (MPa) | 7.6 | 10.1 |
| $E_B$ (%) | 318 | 247 |
| Heat-Aged (7 days at 121° C.) | | |
| $M_{100}$ (MPa) | 10.6 | 12.2 |
| $T_B$ (MPa) | 9.9 | 11.8 |
| $E_B$ (%) | 194 | 196 |
| $E_B$ Retention (%) | 61 | 79 |
| Oil Aged (ASTM oil #2, 18 hours at 100° C.) | | |
| $M_{100}$ (MPa) | 3.7 | 6.3 |
| $T_B$ (MPa) | 4.4 | 6.3 |
| $E_B$ (%) | 350 | 205 |
| Heat Distortion (121° C./2000 g) | | |
| % | 49.2 | 21.4 |

Recipe: Polymer as shown; HAF Black, 20; Mistron Vapor, 25; "Dythal", 5; stearic acid, 0.8; Agerite Resin D, 0.5; Antimony oxide, 5; FR 300 BA, 15.5; low molecular weight polyethylene, 1.5.

We claim:
1. A blend of 80-99 weight percent of chlorinated polyethylene containing 15-60 percent by weight chlorine and from 1-20 weight percent of polyethylene containing 0-50 weight percent chlorine to which is grafted 0.1-5 weight percent unsaturated dicarboxylic acid or anhydride containing 4 to 6 carbon atoms.

2. The blend of claim 1 wherein the chlorinated polyethylene contains 20-40 percent by weight chlorine.

3. The blend of claim 2 wherein the grafted polyethylene contains from 0-5 weight percent chlorine.

4. The blend of claim 2 wherein the grafted polyethylene contains from 20-35 weight percent chlorine.

5. The blend of claim 2 wherein the functional groups are derived from maleic anhydride, maleic acid or fumaric acid and have been reacted with amino groups of a compound containing 2 to 4 amino groups and 2 to 14 carbon atoms or a silane of the formula Si—An, —Bm, —C where -A is alkyl of 1 to 3 carbon atoms, —B is alkoxy of 1 to 3 carbon atoms, —C is —X—NH$_2$ or —X—NH—X—NH$_2$ where —X—is alkylene of 1 to 3 carbon atoms, m+n=3 and n is 0 or 1.

6. A blend of chlorinated polyethylene containing 15-60 percent by weight chlorine, 20-35 percent by weight polyethylene and 2-20 percent by weight polyethylene to which is grafted 0.2-5 percent by weight unsaturated dicarboxylic acid containing 4 to 6 carbon atoms.

* * * * *